US011042213B2

(12) United States Patent
Gendler et al.

(10) Patent No.: US 11,042,213 B2
(45) Date of Patent: Jun. 22, 2021

(54) AUTONOMOUS CORE PERIMETER FOR LOW POWER PROCESSOR STATES

(71) Applicant: Intel Corporation, Santa Clara, CA (US)

(72) Inventors: Alexander Gendler, Kiriat Motzkin (IL); Yoni Aizik, Haifa (IL); Chen Ranel, Shoham (IL); Ido Melamed, Kfar-Saba (IL); Edward Vaiberman, Holon (IL)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 16/370,950

(22) Filed: Mar. 30, 2019

(65) Prior Publication Data
US 2020/0310527 A1 Oct. 1, 2020

(51) Int. Cl.
*G06F 1/32* (2019.01)
*G06F 1/3296* (2019.01)

(52) U.S. Cl.
CPC ................. *G06F 1/3296* (2013.01)

(58) Field of Classification Search
CPC ... G06F 1/26; G06F 1/32; G06F 1/324; G06F 1/329; G06F 1/3228; G06F 1/08; G06F 1/206; G06F 1/3203; G06F 1/3215; G06F 1/3231; G06F 1/3206; G06F 1/3296; G06F 1/3234; G06F 1/3237; G06F 1/3287; G06F 1/266; G06K 15/4055; Y04S 20/20; Y02D 10/00; H04L 12/10
See application file for complete search history.

(56) References Cited

U.S. PATENT DOCUMENTS

| 2004/0083358 | A1* | 4/2004 | Zhou ............... G06F 11/2028 713/100 |
| 2004/0268107 | A1* | 12/2004 | Zimmer ............. G06F 9/4411 713/1 |
| 2008/0010473 | A1* | 1/2008 | Harris ............... G06F 1/3287 713/300 |
| 2011/0138167 | A1* | 6/2011 | Conklin ............ G06F 11/2236 713/100 |

(Continued)

FOREIGN PATENT DOCUMENTS

| KR | 10-2007-0121840 A | 12/2007 |
| KR | 10-2015-0016331 A | 2/2015 |

OTHER PUBLICATIONS

International Search Report and Written Opinion dated Jun. 23, 2020 for International Application No. PCT/US2020/020411, 11 pages.

*Primary Examiner* — Zahid Choudhury
(74) *Attorney, Agent, or Firm* — Schwabe, Williamson & Wyatt, P.C.

(57) ABSTRACT

Embodiments include an autonomous core perimeter, configured to save the state of a core of a multi-core processor prior to the processor package being placed into a low-power state. The autonomous core perimeter of each core is configured to save an image of a microcontroller firmware to an external store if it has not been previously saved by another core, along with the unique working state information of that core's microcontroller. Upon restore, the single microcontroller firmware image is retrieved from the external store and pushed to each core along with each core's unique working state.

25 Claims, 6 Drawing Sheets

(56) References Cited

U.S. PATENT DOCUMENTS

| | | | |
|---|---|---|---|
| 2013/0246825 A1* | 9/2013 | Shannon | G06F 12/0846 |
| | | | 713/324 |
| 2014/0059372 A1 | 2/2014 | Guntur et al. | |
| 2014/0137137 A1* | 5/2014 | Yan | G06F 1/3287 |
| | | | 719/322 |
| 2014/0149732 A1* | 5/2014 | Sanner, III | G06F 9/4405 |
| | | | 713/2 |
| 2014/0371109 A1* | 12/2014 | McMillen | G06F 13/4068 |
| | | | 506/38 |
| 2016/0179177 A1 | 6/2016 | Henry et al. | |
| 2018/0357123 A1* | 12/2018 | Yin | G06F 11/1016 |
| 2019/0065242 A1* | 2/2019 | Therien | G06F 1/3287 |

* cited by examiner

AUTONOMOUS CORE PERIMETER FOR LOW POWER PROCESSOR STATES

TECHNICAL FIELD

Embodiments described herein generally relate to the field of computer processors. In particular, apparatuses and systems that allow the cores of a multi-core processor to be placed into or returned from a low power state are disclosed.

BACKGROUND

Modern processor architecture often makes use of one or more internal processing cores, where each processing core can include a core processing logic and various associated supporting blocks, timers, busses, and similar structures. The core processing logic may process a simplified set of micro-operations, and may employ a microarchitecture that provides logic to convert the processor's external-facing instruction set architecture (ISA, e.g. x86-64) to the internal micro-operations used by the core processing logic. Further still, many modern processors are configured to provide a variety of power levels, to enable various power saving modes. The microarchitecture, in addition to converting between an ISA and internal micro-operations, may coordinate or otherwise facilitate transitioning each processing core into a requested power level.

DESCRIPTION OF EMBODIMENTS

Figure 1:
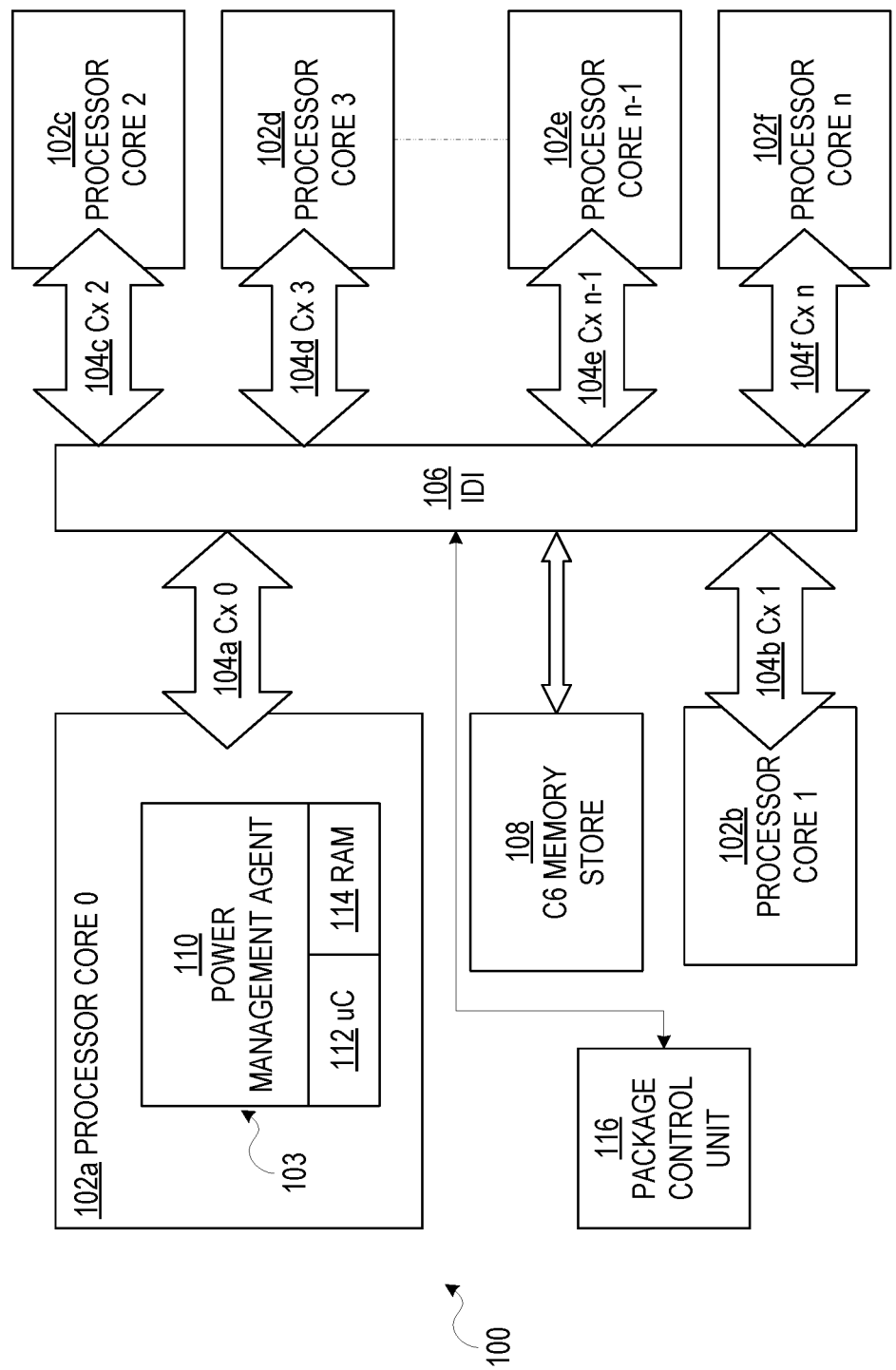
FIG. 1 is a block diagram of some of the components of an example system, such as a multi-core processor, that implements an autonomous core perimeter, according to various embodiments.

Modern processors can include multiple processing cores, where each processing core is capable of entering into various low power states. As the various states progress to more aggressive power saving, increasing numbers of processor components may be powered down. Further, in addition to each core having multiple power states, the overall package (such as in a multi-core processor package) may also have multiple power states. Deeper/more aggressive package states may power down entire cores via power gating mechanisms. A multi-core processor may be configured with multiple power rails to power different components, and one or more (e.g., all) of these various power rails, in some implementations, are capable of being power gated.

Many modern processors that employ a microarchitecture use a microcontroller associated with each core to handle various tasks for the core, such as decoding ISA operations to internal micro operations, managing core register files (that may include internal or transient registers), cache management, and providing various other internal core functions. In some embodiments, a firmware may be executed by the core's microcontroller to enable the tasks; in some instances, this firmware can be considered to be a stripped-down operating system (OS). As with many operating systems, the firmware may also require some form of local storage to maintain information for various working states, e.g. temporary register files, transient machine states and statuses, buffers to allow instruction reordering, etc. In embodiments, the microcontroller includes a firmware that is pre-loaded at time of manufacture or prior to system assembly, and loads automatically upon processor initialization. This firmware may be called "microcode". Further, some implementations may also allow an updated firmware, which may be called "acode" or "a-code", to be dynamically loaded into each core (as opposed to the fixed microcode stored in a read-only memory), to allow for improvements, patches, and other tuning of the firmware (and consequently, the core) over the lifetime of the processor. In some examples, the a-code firmware may be updated via an operating system driver as a machine OS, such as Microsoft Windows® or macOS®, starts up.

Each core of a multi-core processor communicates with internal and external modules over a variety of busses. Further, the various components of a multi-core processor may operate at different clock frequencies. For example, an individual core may be capable of running, and executing instructions, at a clock speed of several gigahertz (GHz). Other components of each core may run at slower clock speeds, in the range of several hundred megahertz (MHz). These various components can be tied together via one or more internal busses. Depending upon the components interconnected by a given bus, the bus may operate at a speed from several hundred MHz to several GHz. As a general principle, a given bus needs to operate at a speed that allows all components connected via the bus to reliably communicate across the bus. Thus, busses that interconnect internal core components that operate in the GHz range may be able to operate in a GHz range, while busses that interconnect one or more components that operate in the MHz range may need to operate in a MHz range.

The width of a given bus, e.g. serial, 8 bit, 64 bit, 256 bit etc., can vary depending upon various factors such as capabilities of connected components, bus speed, bus transmission type (e.g. serial or parallel), and available die space. For a given clock speed, a wide parallel bus can typically transmit more data than a narrow or serial bus. Conversely, narrower busses, serial busses, and/or shorter length busses can typically be driven at a higher clock speed compared to wider and/or longer busses. Busses that interconnect internal components within a core typically are relatively higher speed and/or wider busses to allow quick, low latency transfer of data within a core. Busses that interface a core with external components, e.g. inter-core communication, communication with components outside of the processor die, such as external cache memory, main system memory, and input/output (I/O) subsystems, typically run at speeds that may be a fraction of the speed of an internal core bus.

Because of these bus limitations, communications between a given core and external components typically incur significant latencies compared to intra-core communications that may be handled on a comparatively high speed/wide bus. Relying upon storage external to the core for maintaining working state information and/or firmware would thus result in unacceptably slow processor performance. Consequently, each processor core may rely upon storage positioned within a core, such as a dynamic random access memory (DRAM) or another suitable memory file or unit, to maintain data of both working state information as well as a dynamically loaded firmware image. The storage can be positioned on a wide/fast internal bus to minimize latency.

Due to its nature, DRAM and similar memory types often require constant power to ensure stored contents are retained; loss of power results in data loss. The power rail supplying the memory may be power gated as the core, and subsequently the microprocessor package, is placed into a deeper power saving state. Consequently, the working state and/or firmware image may need to be preserved to storage outside of the core when the core is transitioned from a higher power state to a lower power state where core execution is paused or otherwise halted, if the power rail supplying the memory will be gated. Failure to do so can result in the processor effectively being reset upon power restoration, with the firmware image needing to be reloaded, and the processor reinitialized. Such a process would, at best, result in unacceptable delays every time the processor was placed into a power saving mode, and at worst result in a processor that could not be placed into a low power mode without incurring a system reboot.

Saving the working state and/or firmware to an external storage while the processor is powered allows a processor to be placed into a low power state. The in-core storage can be powered down (with a resultant loss of information), and subsequently restored to its working state upon power-up without needing to fully reinitialize each core. However, as mentioned above, accessing and restoring information from storage external to a core or processor package incurs significant latencies. While this latency is often tolerable on a relatively infrequent basis, a system designer employing such a microprocessor may need to forego placing the microprocessor into a low-power state, which could otherwise help preserve battery life in a portable device, to achieve an acceptable performance, but at the expense of a greater power draw (and, in the case of mobile implementations, associated reduced battery life).

Latency times on a save and subsequent restore are typically related to the amount of data that must be retrieved from external storage and restored to each core. As discussed above, the data may comprise two main components: the working state information of each processor core, and a copy of the firmware image. Of these two components, the working state information, in most implementations, is unique to each processor core, while the firmware image is identical across all cores. Further, the working state information comprises a relatively small amount of data compared to the firmware image. Limiting the amount of data to be transferred to a minimum amount can help keep latency times at a minimum. Thus, by limiting data transfer to the unique working state information for each core, but only a single copy of the firmware image, latency times for saves and restores bracketing a deep power save state can be kept at a minimum, thus allowing more frequent placement of the processor into a deep power save state while still maintaining acceptable performance.

Disclosed embodiments include systems and apparatuses directed to an autonomous core perimeter. The autonomous core perimeter is associated with a core of a multi-core microprocessor, and is adapted to interface between core structures that hold the microcontroller state information and firmware image, and one or more external (to the core) busses and memory units. The autonomous core perimeter, when the core is signaled to transition to a lower power state, coordinates saving the microcontroller state information. Further, the autonomous core perimeter determines whether the firmware image has been saved and, if not already saved by another core, saves the firmware image. Similarly, when the core is signaled to return to a higher power state, the autonomous core perimeter coordinates retrieving and restoring the microcontroller state information and a copy of the firmware image, allowing the core to resume execution. In some embodiments, the firmware image may be able to be retrieved from an external store once, and contemporaneously be read into each processor core, to prevent multiple transfers of the firmware image. Each core of a multi-core processor, in some embodiments, includes its own associated discrete autonomous core perimeter. In other embodiments, multiple cores may attach to a single autonomous core perimeter, which is adapted to coordinate storage and retrieval of the unique state information of each attached core, along with a single copy of the firmware image which is distributed to all attached cores on a return to a higher power state.

In the description herein, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an example system 100 that includes multiple autonomous core perimeter logics according to various embodiments. In one embodiment, system 100 comprises a multi-core processor with a plurality of cores 102a to 102f (collectively or without regard to a specific core, core 102). Each core 102a to 102f in the embodiment is coupled to an autonomous core perimeter logic 103 (ACP 103), respectively. Each core 102 also includes a microcontroller 112, which is also coupled so as to be in communication with, and may be a part of, ACP 103. Each core 102a to 102f is coupled by a circuitry 104a to 104f (collectively or without regard to a specific core, circuitry 104; abbreviated to Cx in FIG. 1) to an in-die (or intra-die) interface (IDI) 106. In embodiments, each of circuitry 104a to 104f is adapted to halt the microcontroller 112 of each of the cores 102a to 102f, save firmware code from the microcontroller 112 of a first one of the plurality of cores 102a to 102f, and save state information from the microcontroller 112 of each of the cores 102a to 102f, based on or triggered by a signal to place the processor into a low power state. It should be understood that, although six cores 102a to 102f and corresponding circuitry 104a to 104f are depicted, this number is arbitrary. Various embodiments may have any number of cores 102a to 102f as well as circuitry 104a to 104f.

Each core 102 in system 100 may act as a processing core, executing one or more threads of software instructions loaded from storage external to system 100. In some embodiments, each core 102 may be application-specific, such as an embedded microcontroller. In other embodiments, each core 102 may be of a general purpose nature, such as may be used in a general purpose computer (which may be implemented as a computing device 1300, described herein with respect to FIG. 6) like a server, desktop, or laptop. Each core 102 may implement a specific instruction set architecture (ISA), such as Intel's x86-64 instruction set or ARM's instruction set. Each core 102 in system 100 may execute the same type of ISA, so that system 100, when implemented as a microprocessor for a computer, can execute multiple software threads written for the ISA. In other embodiments, one or more cores 102 may to execute a different ISA from other cores, so that system 100 is capable of simultaneously or nearly simultaneously executing software written for two or more different ISAs. In still other embodiments, one or more cores 102 may be application-specific or function-specific, where system 100 has one or more cores 102 for general purpose execution, and one or more cores 102 that are dedicated to a specific function, such as OS management, hardware management, management of various internal structures of system 100, or similar specific functionality.

Each core 102, in embodiments, is capable of being placed into multiple power states. For example, a given core 102 may include a C0 state, where the core is active and either processing or idle but ready to process, a C3 state, where the core is powered down, but core perimeter components remain powered and ready to transition the core back to a C0 state, and a C6 state, where the core as well as at least some core perimeter components are also powered down. Depending upon the embodiment, a portion of the core perimeter may remain powered in a C6 state to allow the portion to repower the remainder of the core 102 upon a wake-up signal, or the entire core perimeter may be powered down along with core 102. Where the entire core and core perimeter are powered down, the core 102 may need to rely on external logic to bring the core out of a C6 state. Other power states may be possible depending upon the requirements of a given implementation and available power rails, where various blocks of core 102 can be placed in varying modes of activity or power savings.

Each core 102, in embodiments, includes an autonomous core perimeter logic, or simply core perimeter, ACP 103, that is comprised of components dedicated to a particular core 102, but do not perform the actual processing of ISA instructions. ACP 103 may include a power management agent 110, a microcontroller 112, and local storage such as a random access memory (RAM) 114. Each core 102 may include other components, such as the main processing block. These and other components of each core 102 will be described in greater detail herein with respect to FIG. 2.

In the depicted embodiment, the ACP 103 of each core 102 is coupled to a circuitry 104, which in turn couples the core 102 and ACP 103 with the IDI 106, to allow communications between the core 102, ACP 103, and other components of system 100, including devices external to system 100 such as input/output (I/O) ports, expansion ports, discrete graphics processors (dGPUs), and other components of a computer system, such as computing device 1300. Circuitry 104, in embodiments, communicatively ties the ACP 103 to IDI 106. IDI 106, as will be discussed below, provides a relatively high speed (in terms of clock speed) and wide pathway between a core 102 and other components, including a memory store 108, as compared to other fabrics and busses that may be present within system 100. Circuitry 104 may, in embodiments, coordinate the transfer of firmware and state data to or from core 102, to varying degrees, either by itself or in cooperation with other components of core 102 and/or ACP 103. By tying the ACP 103 to IDI 106, in embodiments, saving of firmware and state information from a core 102 and its ACP 103 can be accomplished with minimal latency, compared to transfer of data over a sideband bus or another channel that may have a significantly slower clock and/or narrower bus width.

Circuitry 104 may be a part of ACP 103, in some embodiments, may be a standalone component or module within core 102, may be a part of another module within core 102 (which itself may be considered a part of ACP 103) or may be a combination of any of the foregoing. Circuitry 104, in some embodiments, is configured to autonomously handle or otherwise coordinate saving of the microcontroller 112 firmware (if not already saved, as will be discussed herein) and state information following notification that the package of system 100 is being placed or may be placed into a low-power state that would result in the microcontroller 112 being depowered. If there is a delay between notification and actual powering down of system 100, each circuitry 104 may be able to save the core firmware (if not already stored) and state information of its associated core 102 prior to package power down, thereby avoiding imposing undesirable latency in the transition of system 100 to a low power state. As will be described in greater detail herein, circuitry 104 can also cause core 102 to at least partially resume execution following saving of state but prior to power down, rather than holding core 102 in a halted state, in the event that a power down of system 100 is aborted.

As depicted in the embodiment of FIG. 1, circuitry 104 may, specifically, tie a power management agent 110 of its associated core 102 to IDI 106. In such an embodiment, the power management agent 110 may be considered to be a part of ACP 103. In still other embodiments, circuitry 104 may include its own control logic that may run a type of firmware or software. Circuitry 104 may coordinate with power management agent 110 to transition one or more components of its associated core 102 to different power states. In some embodiments, circuitry 104 coordinates depowering one or more components of power management agent 110 (such as microcontroller 112).

Circuitry 104 may save the firmware and state information into a memory store 108 designated for a low power state of one or more cores and/or the system 100 package. Although depicted as within system 100, in some embodiments memory store 108 is located external to the system 100 package or otherwise on a separate power rail or power domain from the other components of system 100, to ensure that powering down of system 100 will not power down memory store 108. Memory store 108, depicted as coupled to IDI 106 to provide low latency and high bandwidth storage of firmware and state information, may be of a dynamic RAM (DRAM) type, requiring continuous power to refresh memory contents. In some embodiments, memory store 108 may be a portion of a main system memory on a computer or device using system 100 for a processor, and may be shared with an operating system and/or associate running applications and processes. Memory store 108 may be a portion of main system memory stolen or otherwise allocated from an operating system or running process, and set aside for use for when system 100 is transitioned to a low power state. In other embodiments, memory store 108 may be a separate and/or dedicated memory unit specifically for saving firmware and working state information of each core 102.

IDI 106, in embodiments, is an interface and internal communications bus for system 100 that allows relatively high-speed low-latency data transfers between various components of system 100, such as between cores 102, any cache memories, and/or other components of system 100 that require high bandwidth with low latency. In one embodiment, IDI 106 runs at a clock speed ranging from several hundred megahertz up to several gigahertz, and may match the maximum clock speed of a given core 102. IDI 106 may also be comparatively wide; in one embodiment, IDI 106 is 256 bits wide. Other embodiments may use a narrower or wider bus width, depending upon the needs of a specific implementation. Compared to other internal busses that may be present within system 100, IDI 106 can be significantly faster. Other internal busses may have a maximum clock speed of several hundred megahertz, and/or a width less than 64 bits, 32 bits, 16 bits, or smaller, depending upon the intended purpose of the bus. The wide bandwidth of IDI 106 can allow firmware and state information to be transferred to an external memory, such as memory store 108, with minimal latency.

Power management agent 110, in embodiments, is responsible for transitioning its associated core 102 between power states, such as states C0, C3, and (in some implementations) C6 as described above. As such, power management agent 110 may be configured to power gate, e.g. turn on or off, various components of core 102. Power management agent 110 may include microcontroller 112, as well as a storage 114 (depicted as a RAM unit). Microcontroller 112, in embodiments, is responsible for providing at least some of the functionality of power management agent 110. In other embodiments, microcontroller 112 may also or alternatively provide functionality to the processing core of core 102, described further herein with respect to FIG. 2. Storage 114 may be used by microcontroller 112 and/or power management agent 110 to store both microcontroller firmware as well as working state information, e.g. register values, internal states of the microcontroller 112, temporary data, etc. Still further, power management agent 110 may include a finite state machine (not depicted) to coordinate and transition between power states and the steps necessary to transition. Storage 114 may also be used by this finite state machine to track the current machine state.

In addition to each core 102a to 102f having multiple power states, system 100 as a whole may have multiple power states. For example, one embodiment of system 100 may include a PkgC0 state, where all components of the package are powered (or capable of being powered), a PkgC3 state, where some components, such as each core 102a to 102f and possibly some components external to each core (e.g. uncore), are powered down, and a PkgC6 state, where substantially all package components are powered down, effectively turning the entirety of system 100 off. In some embodiments, either a package control unit (PCU) 116, another component, or a portion thereof, may remain with minimal power to allow the package to be waked from a PkgC6 state. In other embodiments, such as where PkgC6 effectively shuts the entirety of system 100 off, system 100 may need to be waked from a PkgC6 state by some circuitry or component external to system 100.

The PCU 116, in embodiments, can act to coordinate various functions of system 100, such as management of various busses, package power state transitions, signaling of component power state, clock control and alteration, and other necessary tasks for the operation of system 100. PCU 116 may sit outside of the various cores 102a to 102f, and so constitute part of the "uncore" of system 100, namely the various components on system 100 that are external to, but may support, one or more cores 102. In the depicted embodiment, the PCU 116 communicates with the various components of system 100 via DI 106. In other embodiments, PCU 116 may communicate with one or more components over other busses, instead of or in addition to the IDI 106. In still other embodiments, PCU 116 may be in direct communication with one or more components of system 100.

System 100 may be implemented as a single physical package, such as a System on a Chip (SoC) configuration. An SoC configuration may be advantageous in implementing a mobile product that uses system 100. In addition to the various components depicted in FIG. 1, in such a SoC or other embodiment of system 100, other logic blocks are present, such as a memory manager, graphics subsystem, peripheral bus manager, I/O manager, power regulator or manager, and/or any other logic block to enable a single physical package to supply all or substantially all functionality of a computer system utilizing system 100. These components are omitted for ease of understanding the disclosed embodiments. Alternatively, system 100 may be one component of a system with multiple physical packages, such as a general purpose multi-core processor along with a supporting chipset. The chipset can include a northbridge chip and a southbridge chip, along with other components such as memory, a memory management unit (if not integrated into the northbridge chip), a graphics subsystem, a peripheral management unit, and other components appropriate to a given implementation.

Figure 2:
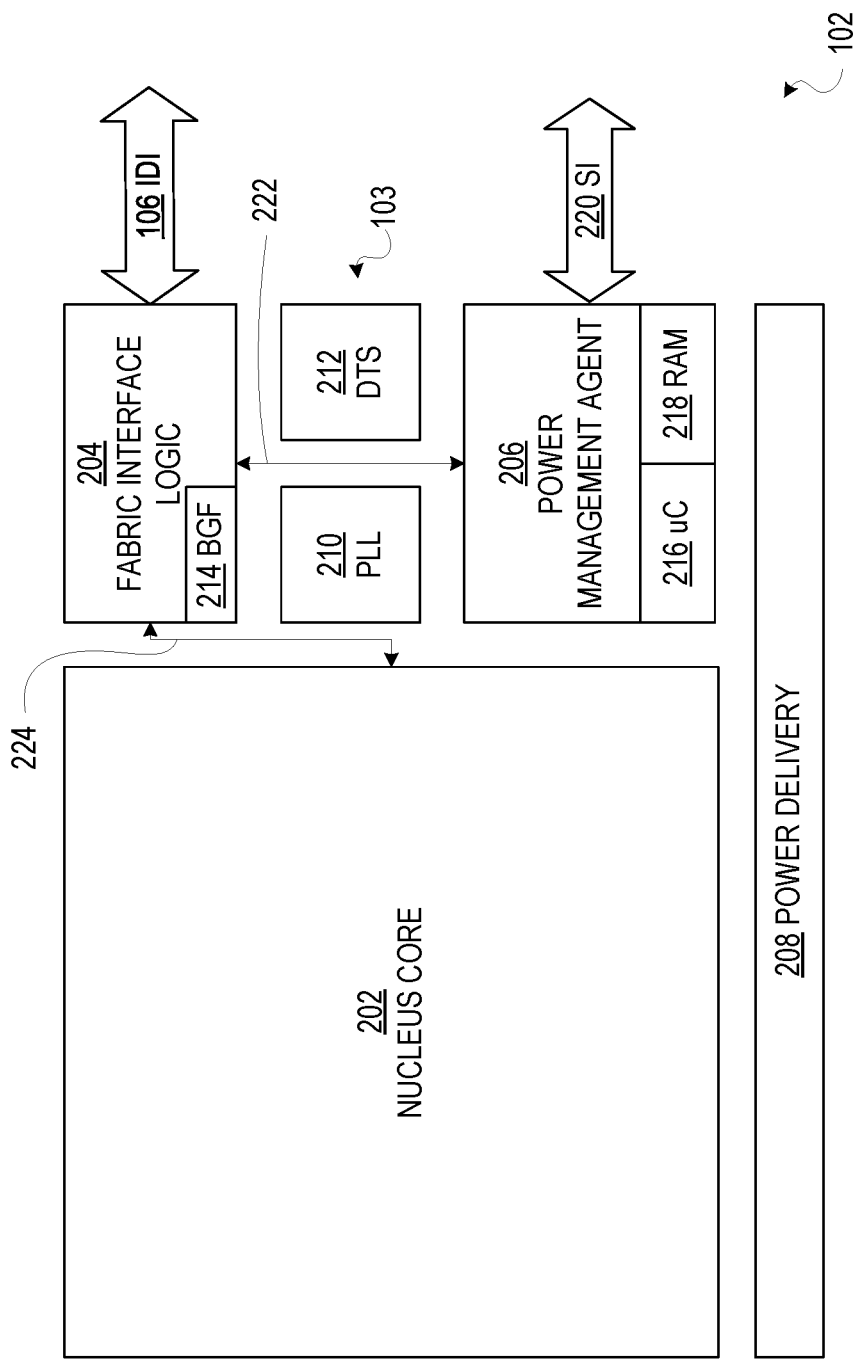
FIG. 2 is a block diagram of an example core from the system in FIG. 1, according to various embodiments.

Turning to FIG. 2, the components of a core 102 are depicted in greater detail. In the depicted embodiment, core 102 includes a nucleus core 202. Other components that comprise the core perimeter include a fabric interface logic (FIL) 204 and associated bubble generating first-in-first-out (FIFO) BGF 214, the power management agent (PMA) 206 and associated microcontroller 216 and RAM 218, as discussed above with respect to FIG. 1, one or more power delivery rails 208, a phase locked loop (PLL) 210, and a digital thermal sensor (DTS) 212. As indicated, these components may comprise at least part of ACP 103, described above. Other depicted components and connections will be discussed below.

Nucleus core 202, in embodiments, include the logics and other various components that carry out execution of one or more software threads. These structures can vary depending upon the particulars of a given processor implementation. Nucleus core 202 may include structures such as one or more arithmetic logic units, floating point units, translation lookaside buffers, branch predictors, register files, multiplexers, decoders, caches, and other such components. The various structures may be organized into one or more multi-stage pipelines to optimize instruction throughput. The nucleus core 202 may be capable of being run at speeds of several gigahertz, and may achieve instruction throughputs better than one operation per clock cycle (e.g. superscalar performance).

Nucleus core 202, in embodiments, communicates with one or more components of ACP 103 as well as IDI 106 via FIL 204. This connection is depicted via connector 224. FIL 204 may be configured to provide a connection "fabric", where various components are communicatively coupled via a mesh of connections, potentially enabling connected components to directly communicate, e.g. point to point, through FIL 204. FIL 204 may also connect to PMA 206 via connector 222. Although not depicted, FIL 204 may further connect to other components within core 102 to facilitate in-core communications. These other connections may be made via other internal busses, which may run at varying speeds and have varying data widths. FIL 204 may, in such embodiments, coordinate buffering of data transfer between components that run at different clock speeds.

Included within FIL 204, in the embodiment of FIG. 2, is BGF 214, the bubble generating FIFO (first in first out). BGF 214 is configured to allow data coming to or from various internal busses of core 102 to operate at differing clock speeds and/or data widths. In this respect, BGF 214 may include buffering capabilities, allowing data to be stored temporarily between bursts from a high bandwidth bus, such as IDI 106, until the data can be fully transferred onto a low bandwidth bus; similarly, it may store data transmitted from a low bandwidth bus until a sufficient amount is obtained to allow it to be burst transferred onto a high bandwidth bus, such as IDI 106.

PMA 206, as discussed above, can handle managing the core power states, e.g. C0, C3, and C6, including transitioning between the various power states, as well as power gating internal components, such as nucleus core 202, PLL 210, DTS 212, and/or other modules. PMA 206, in embodiments, is connected to FIL 204 via connector 222. Connector 222 may comprise an internal bus, which may be of the same or a different bandwidth from IDI 106. Where connector 222 runs slower and/or is narrower than IDI 106, data to or from PMA 206 via connector 222 may pass through BGF 214 to reach IDI 106, where BGF 214 handles translating between clock domains and bandwidth differences, as discussed above. PMA 206 also includes microcontroller 216 and RAM 218, similar to microcontroller 112 and RAM 114 depicted with respect to FIG. 1. In the embodiment depicted in FIG. 2, PMA 206 also may communicate via a sideband interface (SI) 220. SI 220 may connect to similar structures as IDI 106, but allow for out-of-band signaling without consuming bandwidth of IDI 106, particularly when the signaling is of a relatively small payload size. SI 220 may connect within core 102, and/or may connect to one or more uncore components, such as package control unit 116, other power control or management modules, etc.

Microcontroller 216, in embodiments, coordinates the functioning of one or more components of core 102. For example, microcontroller 216 may provide control signaling to nucleus core 202. Depending upon the specific architecture of nucleus core 202, microcontroller 216 may also provide instruction translation and/or decoding, where instructions in the ISA of core 102 are translated into one or more micro-operations for execution by nucleus core 202. For example, some implementations of nucleus core 202 may employ a simplified or reduced instruction set offering only primitive operations, but that can be executed at high speed. Instructions of the ISA for system 100 are broken down into these primitive operations by or under the control of microcontroller 216 prior to processing by nucleus core 202. Likewise, microcontroller 216 may coordinate formatting any data or other results of execution by nucleus core 202 into data or structures conforming to the ISA for system 100. Microcontroller 216, as suggested above with respect to FIG. 1, may also coordinate and/or control operations of other components of core 102, such as one or more components of ACP 103. These functions can include power transitioning via PMA 206, configuration and management of FIL 204 (and associated BGF 214), clock speeds (via PLL 210), throttling of the performance of nucleus core 202 based on sensed conditions (such as over-temperature conditions detected by DTS 212), management of various in-core busses (such as connectors 222 and 224), and any other suitable tasks for managing operations of core 102.

Although depicted as a part of PMA 206, in other embodiments microcontroller 216 may be a separate module or component of core 102. In still other embodiments, RAM 218 may be a part of microcontroller 216, or may be a discrete component or separate module of core 102.

As discussed above, microcontroller 216 may utilize a storage such as RAM 218 during execution. When core 102 is halted, including halting microcontroller 216, the contents of RAM 218 may need to be preserved to ensure that microcontroller 216 can resume execution from the point of halting, thus allowing core 102 to resume execution from its halt point following being placed into a power saving state such as C6 or PkgC6. Depending upon the specific implementation of RAM 218, RAM 218 may require continuous power to maintain its contents (e.g. DRAM). While non-volatile memory storage may also be used, it may not offer the same performance as a DRAM. Where RAM 218 is implemented with DRAM, its contents must be copied to external storage, powered separate from core 102 (and potentially system 100, as discussed above) prior to fully powering down core 102. Fully powering down core 102 in such implementations also results in RAM 218 being depowered, and thus losing its contents. If the contents of RAM 218 are not preserved, then the microcontroller 216 will be unable to resume its execution from prior to powering down. As a result, core 102 will need to be reinitialized, introducing potential latency and/or data loss.

RAM 218 may also include a firmware image for microcontroller 216. As microcontroller 216, in embodiments, is essentially a specific-purpose computer, it may run a form of a minimal or application-specific operating system via firmware, that governs how core 102 operates. This firmware may, in some embodiments, be hard coded or burned into microcontroller 216, or another appropriate structure within core 102. Additionally, some embodiments may allow a new or updated firmware to be loaded into core 102, as discussed above. This new or updated firmware may, in some embodiments, be dynamically loaded by a computer's BIOS, firmware, or operating system following and/or as part of powering up and initializing system 100, along with core 102. In some embodiments, this dynamically loaded firmware is placed into a portion of RAM 218. As with the working state information, this firmware image must be stored external to core 102 prior to powering down of RAM 218. Failure to do so would require the computer or its operating system to reload the new firmware following reinitialization of core 102, which may not be feasible in some implementations, and so require the entire computer/operating system to be rebooted.

Power delivery rail 208 may comprise one or more power rails to supply power to various components within core 102. Where power delivery rail 208 includes multiple rails, each rail may carry different power specifications, e.g. different voltages, different current capacities, etc., depending upon the requirements of components connected to a given rail. Further, multiple rails (either carrying the same power or power of varying specifications) may be employed to allow subsets of components of core 102 to be power gated. For example, nucleus core 202 may be placed on a single power rail 208, FIL 204 may be placed on another rail, and PMA 206 (with microcontroller 216) may be placed on yet another rail. PMA 206 and/or microcontroller 216 may be configured to power gate the various rails of power delivery rail 208. In such embodiments, PMA 206 can power gate nucleus core 202, such as when core 102 is placed into a C3 state, while maintaining power to FIL 204, PMA 206, microcontroller 216, and RAM 218. In such a state, incoming messages can be processed by FIL 204 without the need to power up nucleus core 202, and PMA 206 with microcontroller 216 can maintain control over power gates.

PLL 210, a phase locked loop, provides clock services for core 102, in embodiments. These clock services may include varying clock speeds for different components. For example, nucleus core 202 may require a speed up to several gigahertz, while FIL 204 may only require a clock speed of several hundred megahertz. Microcontroller 216 may require yet another clock speed. Further, PLL 210 may allow the clock speed provided to various components to be boosted or throttled depending upon specific performance requirements for core 102.

DTS 212, the digital thermal sensor, may be equipped to core 102 to monitor its internal temperature condition. When nucleus core 202 and/or other components of core 102 are heavily loaded and/or subject to a high clock speed, they may generate more heat than can be feasibly dissipated by the package of system 100. Consequently, the internal temperature will rise as heat builds up, and may exceed the thermal limits of system 100, potentially resulting in damage to system 100 or one or more of its components. DTS 212, upon detecting a temperature condition approaching or exceeding design limits, can cause the speed of nucleus core 202 (and/or other components) to be throttled at least temporarily, to bring heat generation down to a level where it can be safely dissipated by the package of system 100. In some embodiments, this throttling is handled via microcontroller 216, which accepts data from DTS 212 as an input, and in turn controls PLL 210 to throttle the speed of nucleus core 202. In other embodiments, DTS 212 may be directly coupled to PLL 210 in a control or feedback loop, where a sensed over-temperature condition will automatically cause PLL 210 to throttle clock speeds.

System 100 (and associated cores 102a to 102f) as will be understood, may be embodied as a general purpose processor, suitable for use in various consumer devices such as phones, tablets, watches, servers, laptops, desktops, network devices, embedded systems, and other similar implementations. Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA) for at least part of the components, such as FIL 204, microcontroller 214, PMA 206, and other components of ACP 103.

It should also be understood that in some embodiments of system 100, the various components may use a variety of different arrangements, including different types, so long as a given implementation maintains any necessary functionality. For example, portions of system 100 may be implemented as software (such as firmware for microcontroller 112/216) with other portions implemented in hardware. It should be appreciated that the various blocks in FIGS. 1 and 2 are simply logical depictions of functions; the actual implementation of the blocks can vary from embodiment to embodiment, with functions of different blocks potentially being split or combined into one or more software and/or hardware modules. Some of the components may be omitted or moved to other locations, depending upon a given implementation.

Figure 3:
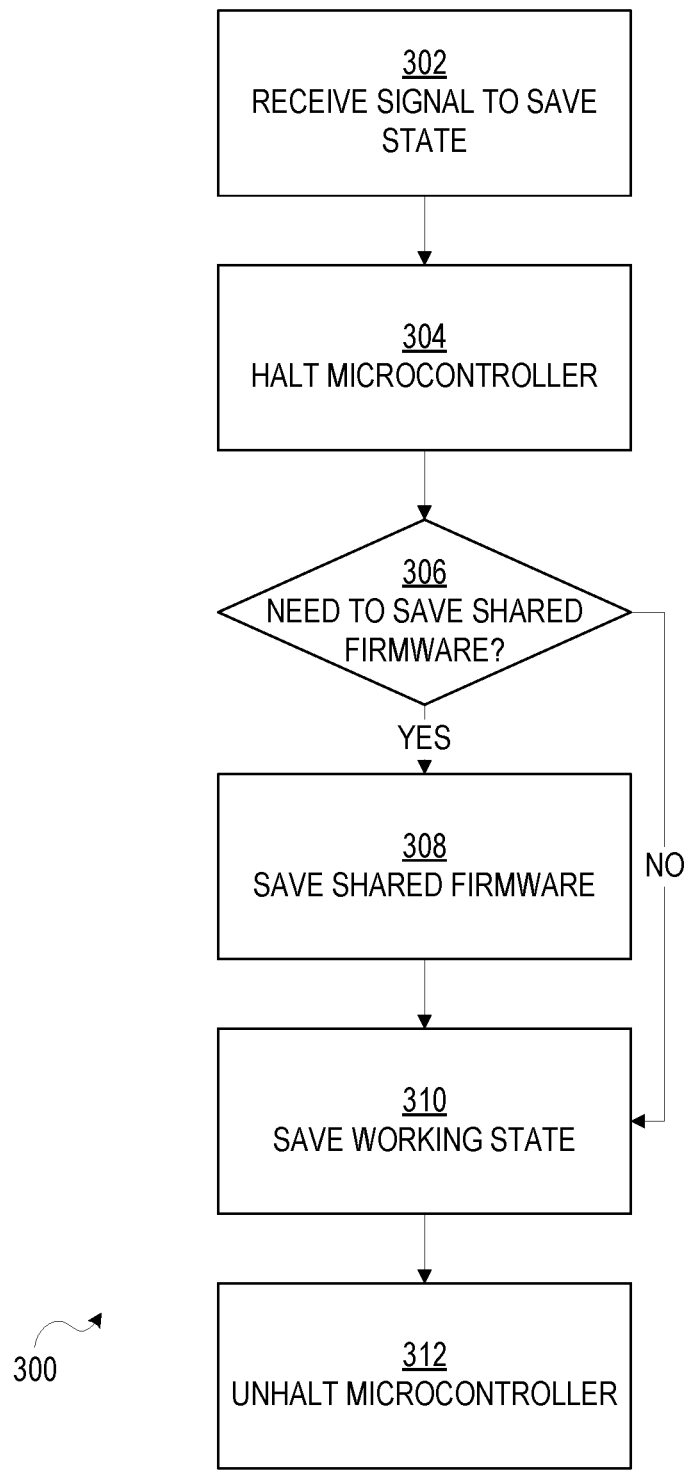
FIG. 3 is a flowchart of various operations that may be executed by the example system of FIG. 1 when transitioning to a package low power state, according to various embodiments.

In FIG. 3, the operations of an example method 300 for saving microcontroller firmware and working state information when potentially transitioning the package of a processor to a low power state are depicted. The operations of method 300 may be performed in whole or in part, and may be performed by one or more components of system 100 and/or a core 102, such as by one or more components of an autonomous core perimeter 103, including a PMA 110/206. Some operations or portions of operations may be performed by a system package, which, in embodiments, may comprise system 100 and its physical packaging, e.g. a system package may be a single physical package, such as a SoC. The following should be read in light of the foregoing discussion of FIGS. 1 and 2, including the foregoing description of the functionality of the various components of system 100 and core 102.

Starting with operation 302, a signal to save state is received, such as by a component of ACP 103. The signal may be sent by a component internal to system 100, such as PCU 116, and/or may originate from outside of system 100, such as by an external power manager or system BIOS or firmware. The signal may be received via an in-die interface, or may be received via a sideband or out of band bus or signaling channel.

In operation 304, the microcontroller is halted, such as by ACP 103. A PMA 206 may coordinate halting the microcontroller. Halting the microcontroller, at least temporarily, may be desirable to ensure that the working state of the microcontroller does not change while it is in the process of being saved.

In operation 306, it is determined whether the firmware image for the microcontroller has been saved to an external store, such as memory store 108. As discussed above, the firmware image, particularly a-code that is dynamically loaded upon system start up, is typically identical across all cores, and further requires significantly more storage than the working state of each microcontroller. Thus, it is redundant, unnecessary, and wasteful of storage resources to store identical copies of the firmware from each core. Furthermore, the greater the amount of data that must be transferred outside of the core to an external storage, the greater amount of latency that is imposed when transitioning system 100 to a low power state. This latency can be saved by only saving a single copy of the firmware image, such as from the first core (in a multi-core system) to save its state. In operation 306, a flag or other signaling mechanism within system 100 may be utilized to indicate whether one of the cores has saved a copy of the firmware image. Some examples of possible signaling include setting a register or flag that is accessible to all cores in system 100, asserting a line, such as on an internal bus, that indicates to all cores that the firmware image is saved, pushing a flag or notification to all cores via an internal bus, or any other method of signaling the ACP of each core that the firmware image has been saved, and need not be saved again.

If the answer to operation 306 is "YES", indicating that the firmware image has not yet been saved to an external storage, method 300 proceeds to operation 308, where the shared firmware image is pushed to the external storage. This may be accomplished by ACP 103, which formats the firmware image and places it onto the IDI 106, using a circuitry 104. As discussed above, in embodiments, the image may be formatted and placed onto the IDI 106 via FIL 204, through BGF 214. Once the firmware image has been saved, the other cores are signaled to this fact, as discussed above, so that further saves are not attempted. ACP 103 and/or FIL 204, in embodiments, may obtain the address or addresses in the external storage to push the firmware image and (in operation 310 below) the working state information.

This address information may be obtained using any suitable technique, such as obtaining the address from a memory manager, a package control unit, an operating system, the memory storage unit, or another source. In some embodiments, this address information may be received over IDI 106, as a data block or other suitable format appropriate to a given implementation of the IDI and any supporting circuitry. An initial address information may be obtained prior to storing of the firmware image. This initial address information, in embodiments, may be obtained by ACP 103 and received over IDI 106.

Depending upon the implementation, the firmware may only need to be saved once while the computer system employing system 100 is powered on. For example, where the firmware image is loaded on boot-up and otherwise never changes, a copy of the firmware image may be retained, such as by an operating system, in a system storage. In other implementations, the firmware image may only be saved once, upon the first time the state information of a first core is saved. In either such implementations, the "YES" path may never be followed for subsequent transitions of the system to a low power state, as the firmware image simply remains in system memory at least for the duration that the computer system remains powered.

Following completion of operation 308, or if the results of operation 306 lead down the "NO" path (e.g. the firmware is already saved or doesn't need to be saved), the working state information of the core is similarly pushed to the external storage, via the same mechanisms as the firmware image described above with respect to operation 306.

Once the working state information is saved, in operation 312 the microcontroller may be unhalted. As the transitioning of the system to a low power state may be aborted, the microcontroller may be required to bring its core back from a halted or low power stage if the system transition to a low power state is aborted. If the system completes transition to a low power state, the microcontroller may be subsequently power gated. In some embodiments, operation 312 may be omitted, such as where the system immediately proceeds to powering down the package.

It may be understood that the working state of the microcontroller may change between the time the working state is stored, in operation 310, and the microcontroller is finally power gated. However, these changes can be ignored. If the microcontroller is power gated, its working state will be restored to the state pushed to the external storage, which is the expected point based on when the signal to save state is received in operation 302. The microcontroller is not expected to incur any significant state changes between saving of the working state and power gating. Conversely, if the transition to a low power state is aborted, then the core and associated microcontroller will continue with execution as normal, and the working state pushed to the external storage can be ignored, as it will be overwritten by a new working state upon the next execution of operation 302.

The firmware image and working states are, in embodiments, stored into a storage unit that is external to system 100, and so can allow system 100 to enter a deep power saving state, where it is fully or nearly fully powered down. The storage unit, as discussed above, remains powered. As discussed above with respect to FIG. 1, the storage unit may be a portion of main system memory stolen or otherwise allocated from an operating system and/or applications (particularly when the application or applications are being slept).

While method 300 is depicted as being performed by a single core, method 300 may be performed by each core in a system 100, either serially, in parallel, or a combination of serial and parallel execution.

Figure 4:
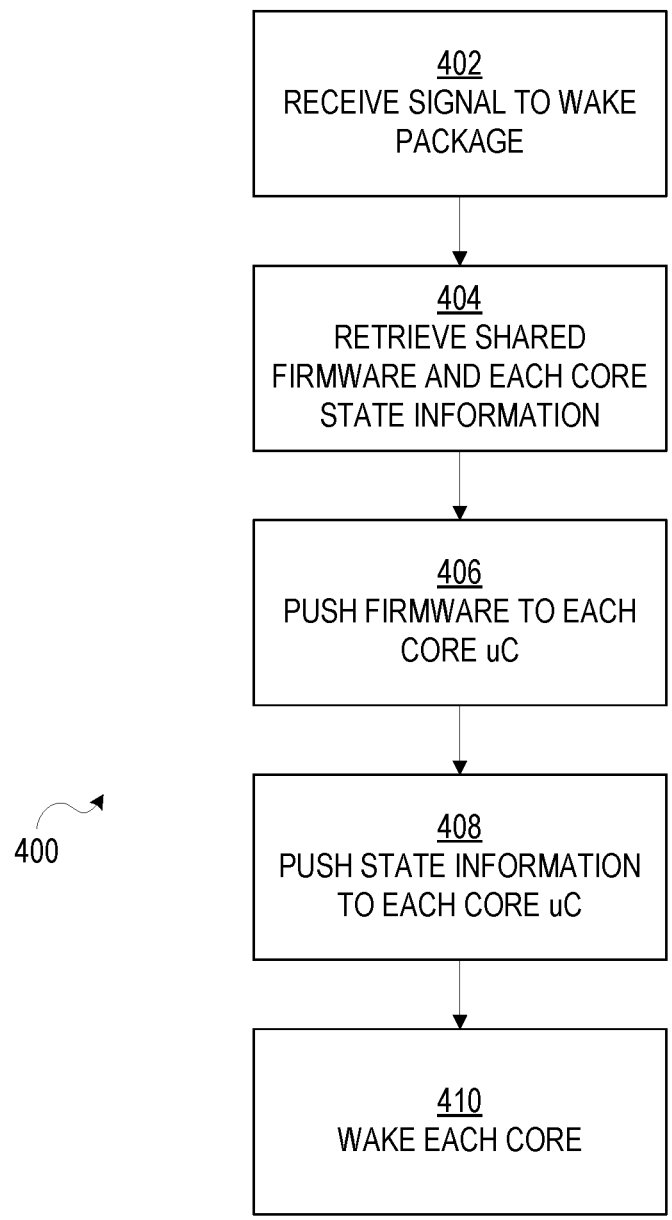
FIG. 4 is a flowchart of various operations that may be executed by the example system of FIG. 1 when transitioning to a package high power state, according to various embodiments.

Turning to FIG. 4, the operations of an example method 400 for restoring microcontroller firmware and working state information when potentially transitioning the package of a processor to a low power state are depicted. The operations of method 400 may be performed in whole or in part, and may be performed by one or more components of system 100 and/or a core 102, such as by one or more components of an autonomous core perimeter 103, including a PMA 110/206. As with method 300, some operations or portions of operations may be carried out at a package or system package level, particularly where system 100 is implemented as a SoC, in a single package. The following should be read in light of the foregoing discussion of FIGS. 1 and 2, including the foregoing description of the functionality of the various components of system 100 and core 102.

Starting in operation 402, a signal to wake the system package, such as system 100, is received. Depending upon how deep the package is placed into a power saving state, this signal may need to come from a source external to the system. In other embodiments, an external signal may first be sent to a package control unit, which in turn signals each core in the system to begin restoring state and transitioning to a higher power level. The mechanics by which these signals are handled may vary depending upon the specifics of a given implementation, and which components within a system handle power gating and powering the system package. Part of operation 402 may include powering at least a portion of a core perimeter in each core, such as an ACP 103, which may then assume responsibility for executing the remaining operations of method 400 upon its associated core.

Following receiving a wake up signal, in operation 404, the shared firmware is retrieved from the external storage, along with the core's unique working state information. Depending upon the specifics of a given implementation, one core of multiple cores may coordinate retrieval of the shared firmware, which may be placed onto an in-die interface or otherwise buffered into the system. In this way, the shared firmware image need only be retrieved from the external storage once; it may then be copied internally within the system to all cores.

In operation 406, the firmware is pushed to each core, and specifically, may be pushed into the storage associated with each microcontroller of each core. This pushing may be handled by the autonomous core perimeter (including the circuitry connecting the ACP to the IDI). In other embodiments, this pushing may be at least partially handled by an uncore structure (e.g. component that is not located within a particular core). As with storage, the ACP or other structure handling restoring the firmware may obtain the address or addresses within the external storage to locate the shared firmware image from a suitable source (and which may be transmitted over an IDI, such as IDI 106 in a data block or other suitable format), as described above with respect to operation 306.

In operation 408, similar to operation 406, the unique working state is pushed to each core, in similar fashion to the shared firmware image. As with operation 406, the address of each unique working state may be obtained and provided to each core's ACP, to separately pull the working state information from the external memory.

Finally, in operation 410, once the shared firmware image and unique working state information has been pushed to each core and placed into each microcontroller's associated storage, each core may be transitioned to a higher power, more operative state.

Figure 5:
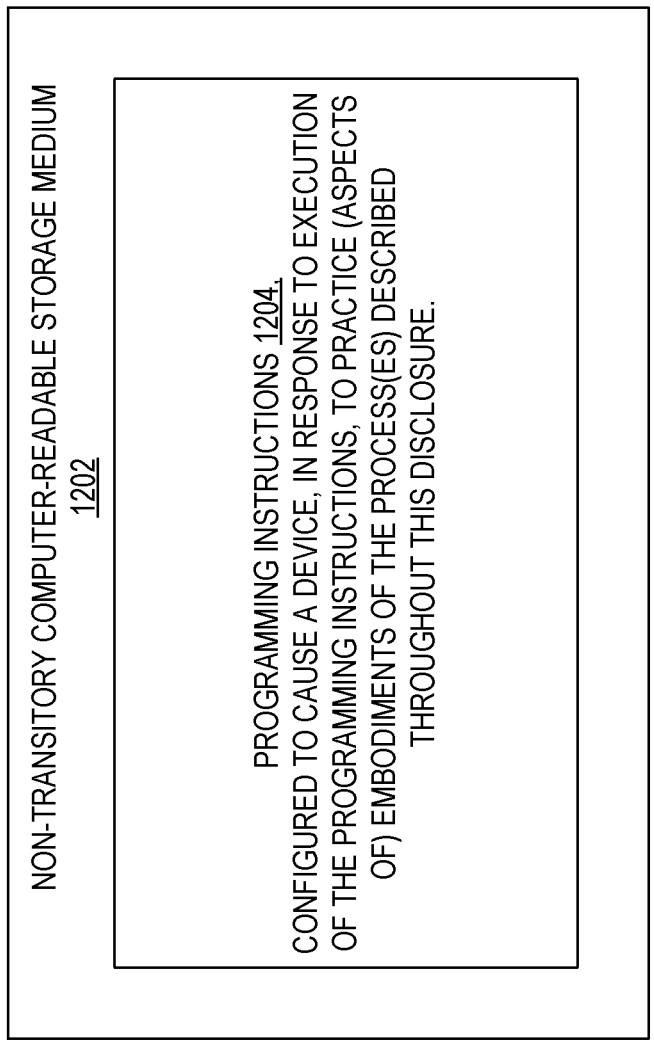
FIG. 5 illustrates a computer readable medium, which may be used to implement one or more components of the system in FIG. 1 and/or one or more operations of FIG. 3 or 4, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., system 100 and/or one or more cores 102, in response to execution of the programming instructions, to implement (aspects of) the methods 300 and/or 400 described above. Further, some aspects of the various components of a core 102 may be implemented via microcontroller 112 executing programming instructions 1204. The firmware image may be implemented with programming instructions 1204. In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 6:
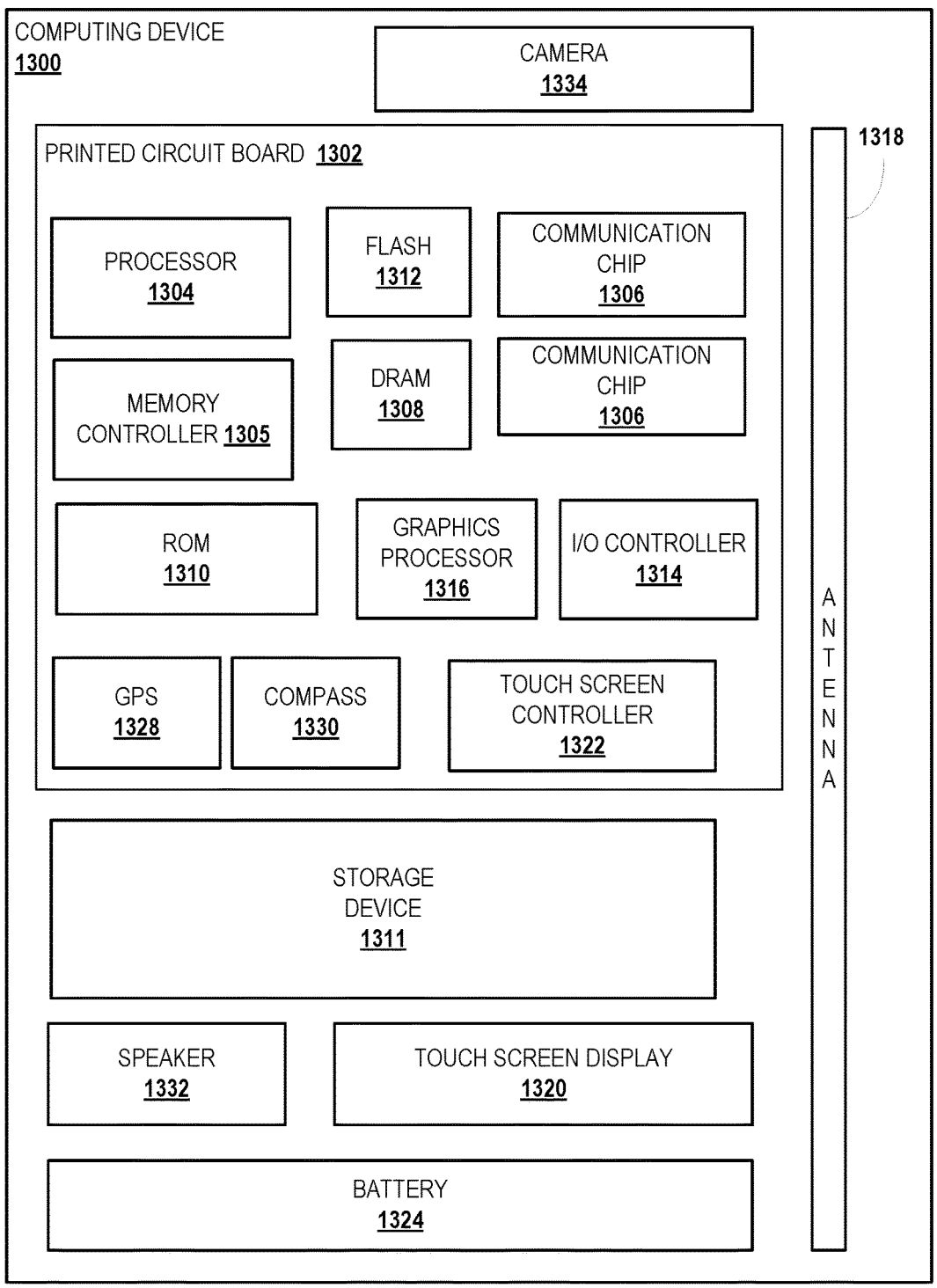
FIG. 6 illustrates an example system configured to employ the apparatuses and methods described herein, in accordance with various embodiments.

FIG. 6 illustrates an example computing device 1300 that may employ the apparatuses and/or methods described herein (e.g., system 100, core 102, method 300 and/or method 400), in accordance with various embodiments. As shown, computing device 1300 may include a number of components, such as one or more processor(s) 1304 (one shown) and at least one communication chip 1306. In various embodiments, the one or more processor(s) 1304 each may include one or more processor cores. In various embodiments, the at least one communication chip 1306 may be physically and electrically coupled to the one or more processor(s) 1304. In further implementations, the communication chip 1306 may be part of the one or more processor(s) 1304. In various embodiments, computing device 1300 may include printed circuit board (PCB) 1302. For these embodiments, the one or more processor(s) 1304 and communication chip 1306 may be disposed thereon. In alternate embodiments, the various components may be coupled without the employment of PCB 1302.

Depending on its applications, computing device 1300 may include other components that may or may not be physically and electrically coupled to the PCB 1302. These other components include, but are not limited to, memory controller 1305, volatile memory (e.g., dynamic random access memory (DRAM) 1308), non-volatile memory such as read only memory (ROM) 1310, flash memory 1312, storage device 1311 (e.g., a hard-disk drive (HDD)), an I/O controller 1314, a digital signal processor (not shown), a crypto processor (not shown), a graphics processor 1316, one or more antenna 1318, a display (not shown), a touch screen display 1320, a touch screen controller 1322, a battery 1324, an audio codec (not shown), a video codec (not shown), a global positioning system (GPS) device 1328, a compass 1330, an accelerometer (not shown), a gyroscope (not shown), a speaker 1332, a camera 1334, and a mass storage device (such as hard disk drive, a solid state drive, compact disk (CD), digital versatile disk (DVD)) (not shown), and so forth. In various embodiments, the processor 1304 may be integrated on the same die with other components to form a System on Chip (SoC).

In some embodiments, the one or more processor(s) 1304, flash memory 1312, and/or storage device 1311 may include associated firmware (not shown) storing programming instructions configured to enable computing device 1300, in response to execution of the programming instructions by one or more processor(s) 1304, to practice all or selected aspects of the methods described herein. In various embodiments, these aspects may additionally or alternatively be implemented using hardware separate from the one or more processor(s) 1304, flash memory 1312, or storage device 1311.

In various embodiments, one or more components of the computing device 1300 may include the system 100 or core 102, and/or may implement one or more operations of method 300 and/or method 400 described herein. For example, the system 100 or core 102 may be implemented in processor 1304, communication chip 1306, I/O controller 1314, memory controller 1305, and/or another component of computing device 1300.

The communication chips 1306 may enable wired and/or wireless communications for the transfer of data to and from the computing device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1306 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 1300 may include a plurality of communication chips 1306. For instance, a first communication chip 1306 may be dedicated to shorter range wireless communications such as Wi-Fi and Bluetooth, and a second communication chip 1306 may be dedicated to longer range wireless communications such as GPS, EDGE, GPRS, CDMA, WiMAX, LTE, Ev-DO, and others.

In various implementations, the computing device 1300 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 1300 may be any other electronic device that processes data.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

The following examples pertain to further embodiments.

Example 1 includes a multi-core processor, comprising two or more cores, each core including a microcontroller and coupled to an autonomous core perimeter logic; and circuitry in communication with each autonomous core perimeter logic adapted to, based on receipt of a signal to place the processor into a low power state, halt the microcontroller of at least one of the two or more cores, save firmware code from the microcontroller of a first one of the two or more cores, and save state information from the microcontroller of each of the two or more cores; and the circuitry is further adapted to, based on receipt of a signal to return the processor from the low power state, restore the firmware code to all of the cores; and restore the respective state information to each core.

Example 2 includes the subject matter of example 1, or some other example herein, wherein the circuitry is in communication with a memory unit, and is to store the firmware code and state information to the memory unit.

Example 3 includes the subject matter of example 1 or 2, or some other example herein, wherein the circuitry is to communicate with the memory unit over an in-die interface.

Example 4 includes the subject matter of any of examples 1-3, or some other example herein, wherein the circuitry comprises a power management agent.

Example 5 includes the subject matter of any of examples 1-4, or some other example herein, wherein the circuitry is further to communicate with the memory unit with a bubble generation first in first out (FIFO) structure.

Example 6 includes the subject matter of any of examples 1-5, or some other example herein, wherein the autonomous core perimeter logic comprises a fabric interface logic.

Example 7 includes the subject matter of any of examples 1-6, or some other example herein, wherein the processor comprises a System on a Chip (SoC).

Example 8 includes the subject matter of any of examples 1-7, or some other example herein, wherein the circuitry is to resume the microcontroller after the firmware code and respective state information have been saved.

Example 9 includes a non-transitory computer readable medium (CRM) containing instructions executable by a circuitry in a processor, that when executed cause the circuitry to halt a microcontroller contained in a core perimeter logic, the core perimeter logic associated with a first processing core of multiple processing cores, wherein each of the multiple processing cores is associated with a core perimeter logic and shares a common microcontroller firmware code; save state information from the microcontroller of the perimeter logic; determine whether the microcontroller firmware code has been saved; and if the microcontroller firmware code has not been saved, save the microcontroller firmware code from the microcontroller of the perimeter logic.

Example 10 includes the subject matter of example 9, or some other example herein, wherein the instructions are to further cause the circuitry to resume the microcontroller once at least the state information has been saved.

Example 11 includes the subject matter of example 9 or 10, or some other example herein, wherein the instructions are to cause the circuitry to save the state information and microcontroller firmware code to a memory unit.

Example 12 includes the subject matter of any of examples 9-11, or some other example herein, wherein the instructions are to be executed by the circuitry following receipt of a signal to place the processor into a low power state.

Example 13 includes the subject matter of any of examples 9-12, or some other example herein, wherein the instructions are to further cause the circuitry to, following receipt of a signal to wake the processor from the low power state, retrieve the firmware code and the state information for the perimeter logic from the memory unit; restore the firmware code and the state information to the microcontroller of the perimeter logic; and resume the microcontroller.

Example 14 includes the subject matter of any of examples 9-13, or some other example herein, wherein the instructions are to further cause the circuitry to resume the microcontroller following receipt of a signal to abort placing the processor into a low power state.

Example 15 includes the subject matter of any of examples 9-14, or some other example herein, wherein the instructions are to further cause the circuitry to receive an in-die interface fabric interface logic data block that includes locations within a memory unit to store the firmware code and state information; and store the firmware code and the state information for the perimeter logic from the memory unit to the memory unit locations.

Example 16 includes a system for managing power states on a multi-core processor, comprising multiple cores, each core coupled to an autonomous core perimeter; circuitry adapted to store firmware code and state information of each autonomous core perimeter; and a memory unit in data communication with the circuitry; wherein the circuitry is adapted to save to the memory unit the firmware code if not previously saved and state information from a first autonomous core perimeter of the multiple cores, and save to the memory unit state information for each remaining autonomous core perimeter of the multiple cores, based on receipt of a signal to place the processor into a low power state.

Example 17 includes the subject matter of example 16, or some other example herein, wherein the autonomous core perimeter comprises a fabric interface logic.

Example 18 includes the subject matter of example 16 or 17, or some other example herein, wherein the circuitry comprises a power management agent.

Example 19 includes the subject matter of example 18, or some other example herein, wherein the power management agent is in communication with the memory unit over an in-die interface.

Example 20 includes the subject matter of any of examples 16-19, or some other example herein, wherein the circuitry is adapted to, based on receipt of a signal to return the processor from the low power state, restore the firmware code stored from the first autonomous core perimeter to each autonomous core perimeter of the multiple cores; and restore the state information to each respective autonomous core perimeter of the multiple cores.

Example 21 includes the subject matter of example 20, or some other example herein, wherein the circuitry is to further halt each autonomous core perimeter based on receipt of the signal to place the processor into a low power state, and is to resume each autonomous core perimeter based on receipt of the signal to return the processor from the low power state.

Example 22 includes the subject matter of any of examples 16-21, or some other example herein, wherein the firmware code and state information are associated with a microcontroller, the microcontroller comprising part of each autonomous core perimeter.

Example 23 includes an integrated circuit, comprising multiple processing means; memory means; and means, coupled to each of the multiple processing means and coupled to the memory means, to store firmware code and state information associated with each processing means into the memory means; wherein, following receipt of a signal to place the integrated circuit into a low power state, the means to store firmware code and state information is to store the firmware code from one of the multiple processing means into the memory means if not previously stored, and store the state information from each of the multiple processing means into the memory means.

Example 24 includes the subject matter of example 23, or some other example herein, wherein, following receipt of a signal to resume the integrated processor from the low power state, the means to store firmware code and state information is to retrieve the firmware code from the memory means and load it into each of the multiple processing means; retrieve the state information for each of the multiple processing means from the memory means; and load the state information of each of the multiple processing means into its respective processing means.

Example 25 includes the subject matter of example 23 or 24, or some other example herein, wherein each of the multiple processing means includes a controller means, the controller means associated with the state information of its respective processing means.

What is claimed is:

1. A multi-core processor, comprising:
   two or more cores, each core including a microcontroller and coupled to an autonomous core perimeter logic; and
   circuitry in communication with each autonomous core perimeter logic adapted to, based on receipt of a signal to place the processor into a low power state:
      halt the microcontroller of at least one of the two or more cores,
      save firmware code from the microcontroller of a first one of the two or more cores, and
      save state information from the microcontroller of each of the two or more cores; and
   the circuitry is further adapted to, based on receipt of a signal to return the processor from the low power state:
      restore the firmware code to all of the cores; and
      restore the respective state information to each core.

2. The processor of claim 1, wherein the circuitry is in communication with a memory unit, and is to store the firmware code and state information to the memory unit.

3. The processor of claim 2, wherein the circuitry is to communicate with the memory unit over an in-die interface.

4. The processor of claim 3, wherein the circuitry comprises a power management agent.

5. The processor of claim 3, wherein the circuitry is further to communicate with the memory unit with a bubble generation first in first out (FIFO) structure.

6. The processor of claim 1, wherein the autonomous core perimeter logic comprises a fabric interface logic.

7. The processor of claim 1, wherein the processor comprises a System on a Chip (SoC).

8. The processor of claim 1, wherein the circuitry is to resume the microcontroller after the firmware code and respective state information have been saved.

9. A non-transitory computer readable medium (CRM) containing instructions executable by a circuitry in a processor, that when executed cause the circuitry to:
   halt a microcontroller contained in a core perimeter logic, the core perimeter logic associated with a first processing core of multiple processing cores, wherein each of the multiple processing cores is associated with a core perimeter logic and shares a common microcontroller firmware code;
   save state information from the microcontroller of the perimeter logic;
   determine whether the microcontroller firmware code has been saved; and
   if the microcontroller firmware code has not been saved, save the microcontroller firmware code from the microcontroller of the perimeter logic.

10. The CRM of claim 9, wherein the instructions are to further cause the circuitry to resume the microcontroller once at least the state information has been saved.

11. The CRM of claim 9, wherein the instructions are to cause the circuitry to save the state information and microcontroller firmware code to a memory unit.

12. The CRM of claim 11, wherein the instructions are to be executed by the circuitry following receipt of a signal to place the processor into a low power state.

13. The CRM of claim 12, wherein the instructions are to further cause the circuitry to, following receipt of a signal to wake the processor from the low power state:
   retrieve the firmware code and the state information for the perimeter logic from the memory unit;
   restore the firmware code and the state information to the microcontroller of the perimeter logic; and
   resume the microcontroller.

14. The CRM of claim 12, wherein the instructions are to further cause the circuitry to resume the microcontroller following receipt of a signal to abort placing the processor into a low power state.

15. The CRM of claim 9, wherein the instructions are to further cause the circuitry to:
- receive an in-die interface fabric interface logic data block that includes locations within a memory unit to store the firmware code and state information; and
- store the firmware code and the state information for the perimeter logic from the memory unit to the memory unit locations.

16. A system for managing power states on a multi-core processor, comprising:
- multiple cores, each core coupled to an autonomous core perimeter;
- circuitry adapted to store firmware code and state information of each autonomous core perimeter; and
- a memory unit in data communication with the circuitry;
- wherein the circuitry is adapted to save to the memory unit the firmware code if not previously saved and state information from a first autonomous core perimeter of the multiple cores, and save to the memory unit state information for each remaining autonomous core perimeter of the multiple cores, based on receipt of a signal to place the processor into a low power state.

17. The system of claim 16, wherein the autonomous core perimeter comprises a fabric interface logic.

18. The system of claim 16, wherein the circuitry comprises a power management agent.

19. The system of claim 18, wherein the power management agent is in communication with the memory unit over an in-die interface.

20. The system of claim 16, wherein the circuitry is adapted to, based on receipt of a signal to return the processor from the low power state:
- restore the firmware code stored from the first autonomous core perimeter to each autonomous core perimeter of the multiple cores; and
- restore the state information to each respective autonomous core perimeter of the multiple cores.

21. The system of claim 20, wherein the circuitry is to further halt the each autonomous core perimeter based on receipt of the signal to place the processor into a low power state, and is to resume each autonomous core perimeter based on receipt of the signal to return the processor from the low power state.

22. The system of claim 16, wherein the firmware code and state information are associated with a microcontroller, the microcontroller comprising part of each autonomous core perimeter.

23. An integrated circuit, comprising:
- multiple processing means;
- memory means; and
- means, coupled to each of the multiple processing means and coupled to the memory means, to store firmware code and state information associated with each processing means into the memory means;
- wherein, following receipt of a signal to place the integrated circuit into a low power state, the means to store firmware code and state information is to:
  - store the firmware code from one of the multiple processing means into the memory means if not previously stored, and
  - store the state information from each of the multiple processing means into the memory means.

24. The integrated circuit of claim 23, wherein, following receipt of a signal to resume the integrated processor from the low power state, the means to store firmware code and state information is to:
- retrieve the firmware code from the memory means and load it into each of the multiple processing means;
- retrieve the state information for each of the multiple processing means from the memory means; and
- load the state information of each of the multiple processing means into its respective processing means.

25. The integrated circuit of claim 24, wherein each of the multiple processing means includes a controller means, the controller means associated with the state information of its respective processing means.

\* \* \* \* \*